(12) United States Patent
Becker et al.

(10) Patent No.: US 9,852,630 B2
(45) Date of Patent: Dec. 26, 2017

(54) DISTRIBUTED REMOTE SENSING SYSTEM COMPONENT INTERFACE

(71) Applicant: fybr, Chesterfield, MO (US)

(72) Inventors: Paul Becker, Eureka, MO (US); Richard E. Goodwin, St. Louis, MO (US); Edwin Horton, Wildwood, MO (US)

(73) Assignee: fybr, Chesterfield, MO (US)

( * ) Notice: Subject to any disclaimer, the term of this patent is extended or adjusted under 35 U.S.C. 154(b) by 0 days.

(21) Appl. No.: 15/593,799

(22) Filed: May 12, 2017

(65) Prior Publication Data

US 2017/0249841 A1    Aug. 31, 2017

Related U.S. Application Data

(63) Continuation of application No. 14/281,024, filed on May 19, 2014, now Pat. No. 9,652,987.

(60) Provisional application No. 61/824,609, filed on May 17, 2013.

(51) Int. Cl.
*G08G 1/14* (2006.01)

(52) U.S. Cl.
CPC .................... *G08G 1/144* (2013.01)

(58) Field of Classification Search
None
See application file for complete search history.

(56) References Cited

U.S. PATENT DOCUMENTS

| | | | |
|---|---|---|---|
| 4,321,589 A | 3/1982 | King | |
| 4,626,850 A | 12/1986 | Chey | |
| 5,182,564 A | 1/1993 | Burkett et al. | |
| 5,640,386 A | 6/1997 | Wiedeman | |
| 5,672,975 A * | 9/1997 | Kielb | G01F 23/284 324/644 |
| 6,427,913 B1 | 8/2002 | Maloney | |
| 6,502,053 B1 | 12/2002 | Hardin et al. | |
| 7,104,447 B1 | 9/2006 | Lopez et al. | |
| 7,113,127 B1 | 9/2006 | Banet et al. | |
| 8,031,650 B2 | 10/2011 | Petite et al. | |
| 8,223,010 B2 * | 7/2012 | Petite | G01D 4/004 340/539.1 |
| 2003/0169183 A1 | 9/2003 | Korepanov et al. | |
| 2004/0075582 A1 | 4/2004 | Bergan et al. | |
| 2004/0212500 A1 * | 10/2004 | Stilp | G08B 19/005 340/541 |

(Continued)

FOREIGN PATENT DOCUMENTS

WO    2010069002    6/2010

OTHER PUBLICATIONS

International Search Report, International Application No. PCT/US2014/038585, dated Nov. 25, 2014.

(Continued)

*Primary Examiner* — Julie Lieu
(74) *Attorney, Agent, or Firm* — Perman & Green, LLP

(57) ABSTRACT

A distributed remote sensing system including at least one gateway, at least one sensing device and a communication interface providing radio frequency communication through a shared frequency scheme between each sensing device and one of the at least one gateway and between each sensing device and another of the at least one gateway through a different frequency scheme.

20 Claims, 7 Drawing Sheets

(56) References Cited

U.S. PATENT DOCUMENTS

| | | | |
|---|---|---|---|
| 2005/0218465 A1* | 10/2005 | Cummins | G01N 27/121 257/414 |
| 2005/0226201 A1* | 10/2005 | McMillin | H04L 45/00 370/348 |
| 2006/0109815 A1* | 5/2006 | Ozer | H04W 48/16 370/329 |
| 2006/0197650 A1 | 9/2006 | Jones et al. | |
| 2007/0050240 A1 | 3/2007 | Belani et al. | |
| 2007/0085067 A1 | 4/2007 | Lewis | |
| 2007/0093974 A1 | 4/2007 | Hoogenboom | |
| 2008/0165030 A1* | 7/2008 | Kuo | G06Q 10/02 340/932.2 |
| 2009/0310571 A1 | 12/2009 | Matischek et al. | |
| 2010/0194565 A1 | 8/2010 | Houston | |
| 2011/0082991 A1 | 4/2011 | Leman et al. | |
| 2011/0178703 A1* | 7/2011 | Aben | G01C 21/3679 701/408 |
| 2011/0218940 A1 | 9/2011 | Bergstrom et al. | |
| 2011/0257935 A1 | 10/2011 | De Graaf et al. | |
| 2011/0273323 A1 | 11/2011 | Bays et al. | |
| 2011/0298603 A1 | 12/2011 | King et al. | |
| 2011/0298634 A1* | 12/2011 | Beverung | H04Q 9/00 340/870.02 |
| 2011/0309953 A1 | 12/2011 | Petite et al. | |
| 2011/0316716 A1* | 12/2011 | MacKay | G04C 11/026 340/870.02 |
| 2012/0079149 A1 | 3/2012 | Gelvin et al. | |
| 2012/0098677 A1* | 4/2012 | Geelen | G01C 21/32 340/932.2 |
| 2012/0182160 A1 | 7/2012 | Hod | |
| 2012/0185569 A1* | 7/2012 | Das | H04W 4/006 709/219 |
| 2012/0286968 A1* | 11/2012 | Jones | G07B 15/02 340/870.02 |
| 2012/0307681 A1* | 12/2012 | Hirata | H04W 48/16 370/254 |
| 2012/0307711 A1* | 12/2012 | Yoon | H04B 7/15542 370/315 |
| 2013/0038461 A1 | 2/2013 | Hawkes et al. | |
| 2013/0201316 A1* | 8/2013 | Binder | H04L 67/12 348/77 |
| 2013/0214937 A1* | 8/2013 | Petite | G01D 4/004 340/870.03 |
| 2013/0242905 A1* | 9/2013 | Rasband | H04W 56/0015 370/329 |
| 2014/0108107 A1* | 4/2014 | Jones | G07B 15/02 705/13 |
| 2014/0214499 A1 | 7/2014 | Hudson et al. | |
| 2014/0214500 A1 | 7/2014 | Hudson et al. | |
| 2014/0324614 A1 | 10/2014 | Kulkarni et al. | |
| 2014/0324615 A1 | 10/2014 | Kulkarni et al. | |
| 2014/0340243 A1* | 11/2014 | Becker | G08G 1/144 340/933 |
| 2014/0342734 A1* | 11/2014 | Tsuda | H04W 24/08 455/434 |
| 2015/0108901 A1* | 4/2015 | Greene | H05B 37/0218 315/149 |

OTHER PUBLICATIONS

International Search Report, International Application No. PCT/US2014/038588, dated Sep. 24, 2014.

International Search Report, International Application No. PCT/US2014/038592, dated Oct. 2, 2014.

* cited by examiner

DISTRIBUTED REMOTE SENSING SYSTEM COMPONENT INTERFACE

CROSS-REFERENCE TO RELATED APPLICATIONS

This application is a continuation of U.S. Non-provisional patent application Ser. No. 14/281,024, filed on May 19, 2014, which claims the benefit of and priority from U.S. Provisional Patent Application No. 61/824,609 filed on May 17, 2013, the disclosures of which are incorporated herein by reference in their entireties.

BACKGROUND

1. Field

The exemplary embodiments generally relate to distributed remote sensing systems and, more particularly, to distributed remote sensing systems having remote sensors for sensing a predetermined physical characteristic.

2. Brief Description of Related Developments

Parking monitoring/detection systems have traditionally been used to raise revenue. Such devices have included a timer and a winding mechanism requiring coins. More recently, electronic meters have been developed which include an electronic timer having an LCD time indicator.

With the advent of electronic parking monitoring devices, attempts have been made to make the parking monitors interactive with vehicle traffic in the associated parking space. One way to obtain information about vehicle traffic at parking spaces is to couple the parking monitor to a vehicle sensing device. The vehicle sensing device can detect when a vehicle enters a parking space as well as when the vehicle leaves. Attempts have also been made to centralized vehicle parking space monitoring where data collected by the vehicle sensing devices is ultimately transferred to a centralized monitoring location for analysis and application to user accounts.

Generally, the vehicle sensing devices and communication means between the vehicle sensing devices and the centralized monitoring location must be powered. It may be prohibitive to provide hard lined power to each vehicle sensing device and each communication means. As such, the vehicle sensing devices and communications means may have limited power supplies. The parking monitoring system components are also subject to failure and/or outages.

It would be advantageous to have a distributed remote sensing system that improves reliability through one or more redundancies in the system as well as improve power management of the system components.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 1:
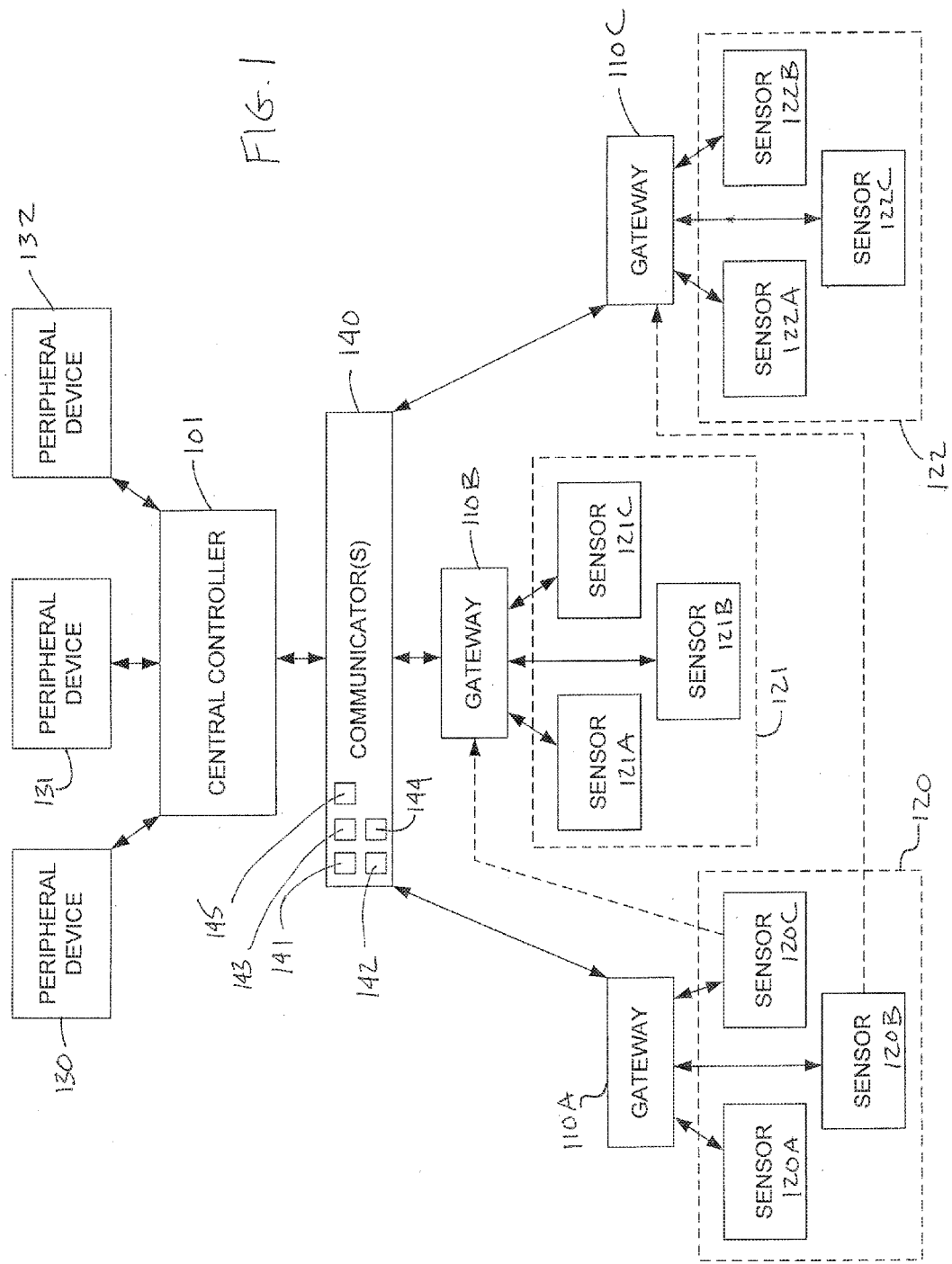
FIG. 1 is a schematic illustration of a portion of vehicle parking meter system in accordance with aspects of the disclosed embodiment.

FIG. 1 is a schematic illustration of a portion of a distributed remote sensing system in accordance with aspects of the disclosed embodiment. The distributed remote sensing system may include remote sensors for sensing characteristics such as vehicle detection, traffic patterns, vehicle navigation, vehicle position or any suitable predetermined characteristic. Although the aspects of the disclosed embodiment will be described with reference to the drawings, it should be understood that the aspects of the disclosed embodiment can be embodied in many forms. In addition, any suitable size, shape or type of elements or materials could be used.

In one aspect the distributed remote sensing system may be a vehicle parking meter/detection system 100 having a centralized controller that may provide at least monitoring and/or billing services for the use of one or more vehicle parking spaces. In one aspect, the vehicle parking meter system 100 may include a central controller 101, one or more gateways 110A-110C, one or more sensing device groups 120-122 and one or more peripheral devices 130-132 which may include any suitable display for displaying any suitable information pertaining to one or more parking spaces. In other aspects the vehicle parking meter system may include any suitable number and type of components to facilitate the monitoring of the vehicle parking spaces associated with the vehicle parking meter system 100. The central controller 101 may be any suitable controller capable of communicating with the one or more gateways 110A-110C (and sensing devices in communication with the one or more gateways) and the one or more peripheral devices 130-132 using any suitable wireless or wired communication interface link that extends from the sensing devices to the central controller and from the central controller to the peripheral devices (it is noted that the interface may include a single communication protocol or a combination of different communication protocols). In one aspect communication between at least the central controller 101 and one or more of the gateways 110A-110C (as well as the sensing devices) and/or peripheral devices 130-132 may be through a cellular communication link 141, a satellite communication link 142, public switched telephone network 145, Internet/World Wide Web 143, Ethernet 144, local area network or other suitable wireless or wired protocol or connection. In one aspect communications from the sensing devices in the sensing device groups 120-122 may be provided substantially in real time to the central controller 101 and/or peripheral devices 130-132.

The central controller 101 may include one or more processors, a memory and any other suitable hardware/software configured to track and report, for each parking space being monitored, a user of the parking space, parking space assignments/allocations, time of arrival, time of departure, transaction rates, user account monetary balances, billing transactions, parking violations, parking space availability or any other suitable information pertaining to the use and billing of each parking space monitored by the vehicle parking meter system 100. The central controller 101 may be configured with one or more user interfaces to allow user access to and operation of the central controller 101. In one aspect the central controller 101 may be any suitable computing device having a monitor, keyboard and/or other suitable user interface. In other aspects, one or more of the peripheral devices 130-132 may provide a user interface for accessing and operating the central controller 101 either through any suitable long or short range wireless communication link and/or through a wired connection. The central controller 101 may be configured to receive any suitable data from the sensing devices. The data sent from the sensing devices may include or otherwise embody, for example, any suitable data related to a parking space being monitored, vehicle detection, and or a health and welfare/maintenance status of the sensing device. In one aspect the central controller 101 may be configured to perform any suitable processing on the data from the sensing devices while in other aspects the data from the sensing devices may be configured, e.g. without processing by the central controller 101, for display on one or more of the peripheral devices.

In one aspect one or more of the peripheral devices 130-132 may include, for example, an enforcement unit which may be a hand held unit for use by parking/law enforcement personnel. The enforcement unit may be configured to report parking violations and/or the issuance of parking tickets to the central controller 101 so that electronic ticketing and data capture is integrated into the distributed remote sensing system. For example, a law enforcement officer using a peripheral device 130-132 may arrive at a parking space after being notified of a violation and make a visual inspection of the parking space to verify that there is a vehicle in violation of a law. The violation may be entered into the peripheral device 130-132 and optionally pictures of the vehicle in violation can be taken with the peripheral device or otherwise loaded into the peripheral device. A citation may be generated in any suitable manner, such as being printed from the peripheral device 130-132 and affixed to the vehicle in any suitable manner. The enforcement unit may also report any other actions taken by, for example, the parking enforcement personnel and/or any other suitable information to the central controller 101. As such, violation data entered into the peripheral device is automatically captured and stored in a memory, such as a memory of the central controller 101 in substantially real time. As may be realized storing the violation information within the distributed remote sensing system stops the system from alerting an enforcement officer to that space until another violation threshold is met or a new vehicle parks in the space. In another aspect, the sensing devices may also be used in non-parking spaces such as in front of fire hydrants, fire lanes, cross walks, intersections, etc. The distributed remote sensing system can be configured to create a violation after any suitable predetermined time period whenever a vehicle is parked in one of these non-parking spaces so that an alert is sent to an enforcement officer through, for example, a peripheral device 130-132. As may be realized, the distributed remote sensing system may incorporate any other suitable sensors such as cameras and infrared sensors that may be used in conjunction with the sensing devices of the sensor groups 120-122. Information from the cameras and/or infrared sensors may be used in conjunction with the violation data provided by the sensing devices of the sensor groups 120-122 to track violations and the history of the violations. The violation history can be printed from, e.g., a peripheral device 130-132 for adjudication purposes, including parking sensor time stamps of vehicle entry/exit from a parking space.

The one or more of the peripheral devices 130-132 may also include, for example, a motorist unit which may be a handheld unit for use by motorists accessing the parking spaces that are monitored by the vehicle parking meter system 100. In one aspect the motorist unit may be a dedicated vehicle parking system hand held unit while in other aspects the motorist unit may be integrated into a user's wireless phone, vehicle GPS unit, or other user computing device such as through an application program capable of running on the wireless phone, GPS unit or other computing device. In still other aspects the motorist unit may be implemented in any suitable manner for allowing the motorist to, for example, check an account balance, add funds to the user's account, perform billing/violation payment transactions, find available parking spaces or any other suitable action(s) such as reserving one or more parking spaces for a predetermined time and date. The motorist unit may provide a motorist with way finding information, e.g. based on data provided by the sensing devices, that includes a substantially real time view of the availability of parking (and routing thereto) throughout the deployment area of the distributed remote sensing system. The motorist unit may be configured to allow a user to select a location and see how full the parking spaces are in an area using, for example, color coded or other suitable indicators. Pricing to park in each parking space may also be provided. The way finding information provided by the motorist unit may also allow a user to keep track of where they park. In one aspect the motorist unit may include or be used in conjunction with a global positioning system or other mapping data to provide a user with traffic information related to the parking spaces so that the user can select, for example a parking lot exit or street that is not congested with vehicles leaving parking spaces monitored by the distributed remote sensing system.

As noted above the central controller 101 may be connected to the one or more gateways 110A-110C (and to the sensing devices) in any suitable manner. In one aspect one or more communicators 140 may be used as a communication link between the gateways 110A-110C and the central controller 101. The one or more communication links 140 may include, for example, one or more cell towers/providers in a cellular communication network. In other aspects the one or more communication links 140 may include, for example, one or more satellites in a satellite communication network, a public switched telephone network, Internet/World Wide Web access points or any other suitable communication access points such as those used in the wired and/or wireless communication protocols described above. In still other aspects the one or more communication links 140 may be a combination of cellular and satellite communication or any other suitable wired or wireless communication link.

Figure 2:
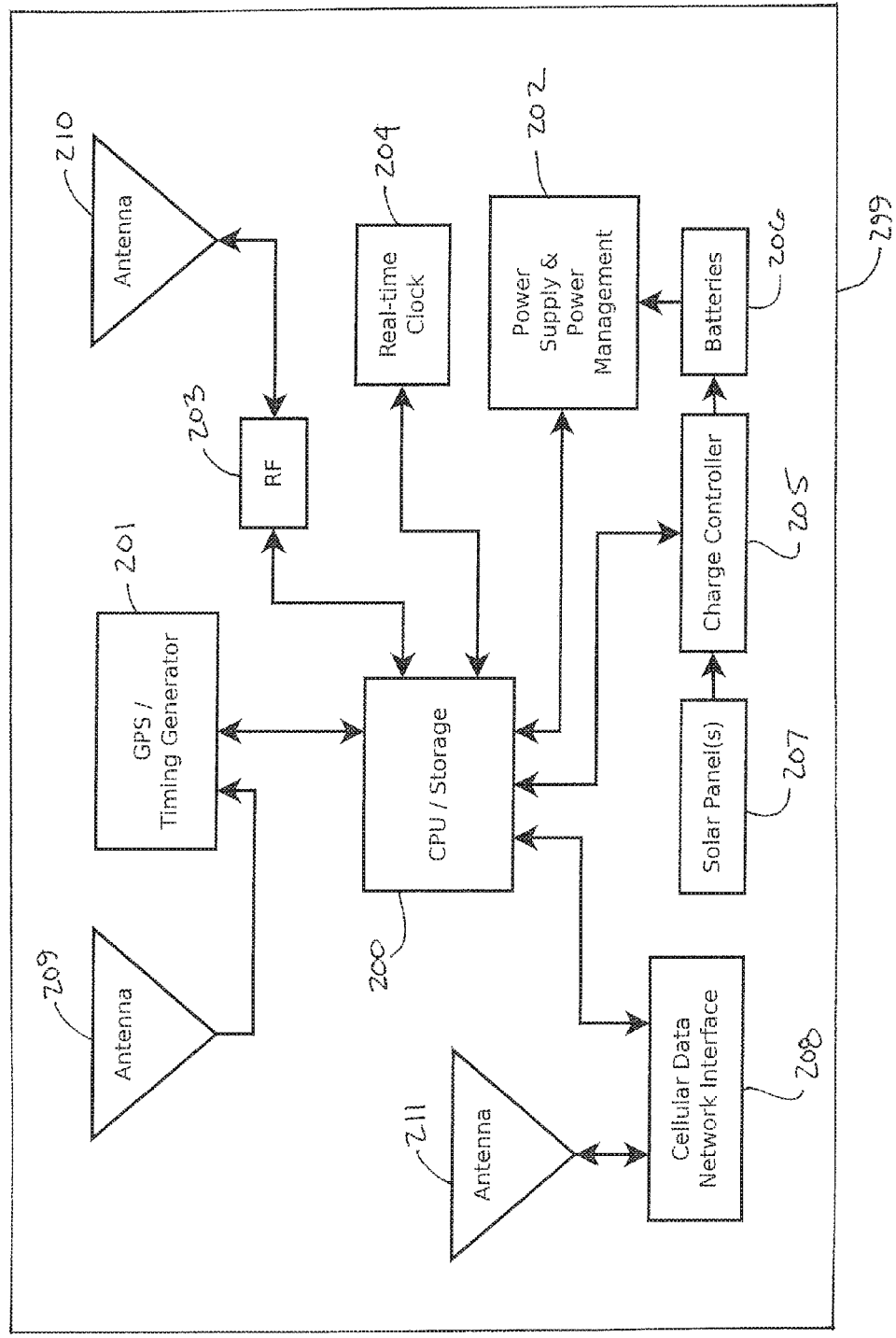
FIG. 2 is a schematic illustration of a portion of the vehicle parking meter system of FIG. 1 in accordance with aspects of the disclosed embodiment.

Referring also to FIG. 2, each of the gateways 110A-110C may include any suitable housing 299 having any suitable shape and size. In one aspect the housing is weatherproof and may be UV (ultraviolet) ray resistant. The housing 299 may be constructed of any suitable material so that, in one aspect, radio frequencies are allowed to pass through the housing. Each gateway 110A-110C (generally referred to as gateway 110) may include, e.g. within a respective housing, a processor module 200 (which may include any suitable memory and suitable programming and may be configured for performing the functions of the gateway as described herein), GPS module 201, a clock module 204, a charge controller 205, a power supply module 202 and any suitable number of communication modules 203, 208.

The GPS module 201 may be operably connected to the processor module 200 and include any suitable antenna 209 for communicating with one or more GPS satellites. The GPS module 201 may be configured to provide any suitable data to the processor module including, but not limited to location/positioning data, date data and time data. The clock module 204 may be operably connected to the processor module 200 and provide the processor module 200 with time data which may be periodically (or at any suitable time(s)) updated by the processor module 200 using date and/or time data obtained from the GPS module 201.

The charge controller 205 may be operably connected to the processor module 200. One or more solar panels 207 may be disposed on, located remotely from or otherwise connected to the housing 299. In one aspect, the one or more solar panels 207 may be movable and configured in any suitable manner to track one or more available light sources, such as e.g. the best light source, to optimize a recharge cycle of the one or more power storage units 206. Here the one or more solar panels may include any suitable motors and light sensors for effecting light tracking movement of the one or more solar panels. As may be realized, the motors and light sensors may be connected to the processor module 200 for any necessary calculations and control for effecting the light tracking movements. In other aspects the solar panels 207 may include a processor for performing the necessary calculations to effect the light tracking movement. The solar panels 207 may be operably connected to the charge controller 205 for charging one or more rechargeable power storage units 206. In one aspect the gateway 110 may be configured to operate substantially from power provided by the one or more solar panels 207 during lighted conditions (e.g. during the day) and substantially from power provided by the one or more rechargeable power storage units 206 during unlighted or low light conditions (e.g. at night, dusk, dawn, etc.). In other aspects the gateway 110 may be configured to operate from power provided by a combined output of the one or more solar panels 207 and the one or more power storage units 206. In still other aspects the gateways may be powered with a hard line such as from a utility source and include suitable electronics for converting the utility power to power that is usable by the gateway.

The power supply 202 may be operably connected to the processor unit 200 and the one or more power storage units 206 to provide and manage power from the one or more power storage units 206 and/or solar panels 207 for the operation of the gateway 110. In one aspect, the power supply module 202 may provide a charge status of the one or more power storage units 206 to the processor module 200. The processor module 200 may be configured, e.g. when the charge status reaches a predetermined threshold or at any other suitable time, to effect operation of the charge controller 205 so that power is transmitted from the one or more solar panels 207 to the one or more power storage units 206 for charging the one or more power storage units 206. The power supply module 202 may also provide predictive maintenance that monitors, for example, the charge cycles of the one or more power storage units 206. The processor module 200 may be configured to determine or otherwise predict a life of the one or more power storage units 206 using data from, for example, the power supply module 202, such as a voltage/current curve of the one or more solar panels 207 and/or the charge cycles of the one or more power storage units 206. The processor module 200 may cause a message (including a status/life of the one or more power storage units 206) to be sent from the gateway 110 to the central controller 101 for communication to any suitable operator/maintenance personnel of the vehicle parking meter system 100.

In one aspect the gateway 110 may include two communication modules 203, 208. One of the communication modules 203 may be a "local" communication module configured for, e.g., communication with respective sensing devices 120A-120C, 121A-121C, 122A-122C over any suitable wireless protocol such as a cellular, satellite or other long or short range communication protocol. Another of the communication modules 208 may be a "distant" communication module configured for, e.g., communication with the one or more communicators 140 using, for example, antenna 211 as will be described in greater detail below. In other aspects, a single communicator may be used to communicate with both the sensing devices 120A-120C, 121A-121C, 122A-122C and the one or more communicators 140.

In one aspect any suitable antenna 210 may be connected to the communication module 203 for allowing any suitable radio frequency communication with the sensing devices 120A-120C, 121A-121C, 122A-122C. The antenna 210 may be disposed within the housing 299, mounted to or remotely located from the housing 299. In one aspect the antenna 210 may be a directional antenna that is rotatable/swivelable to point in the direction of a sensing device 120A-120C, 121A-121C, 122A-122C for transmitting information to or receiving information from the sensing device 120A-120C, 121A-121C, 122A-122C. The directional antenna may improve gains received by the gateway 110 by directing the antenna at the sensing devices 120A-120C, 121A-121C, 122A-122C. In one aspect the antenna 210 may be mounted on a rotatable mount and include any suitable drive motor for rotating the antenna. The processor module 200 may include a memory that is configured to store a directional orientation of the antenna 210 for each of the sensing devices 120A-120C, 121A-121C, 122A-122C communicating with the gateway. This directional orientation for each sensing device 120A-120C, 121A-121C, 122A-122C may be established using a line of sight alignment while in other aspects the directional orientation may be substantially automatically established and/or fine-tuned using a signal strength of a sensing device communication. For example, the processor unit 200 may use the antenna 210 to monitor the signal strength of messages coming from the sensing devices and adjust the directional orientation of the antenna 210 so that a maximum or best possible signal strength is obtained and the directional orientation for the respective sensing device is stored in memory. Adjustments to the directional orientation of the antenna 210 may be made as necessary by the gateway 110. In one aspect, upon installation of a new or additional sensing device 120A-120C, 121A-121C, 122A-122C the gateway 110 may be configured to automatically detect the new or additional sensing device by sweeping the antenna 210 through the operational area of the gateway and record the directional orientation of the antenna 210 for communicating with the new or additional sensing device based on the signal strength of a message transmitted from that new or additional sensing device. In other aspects the antenna 210 may be an omni-directional antenna.

Figure 3:
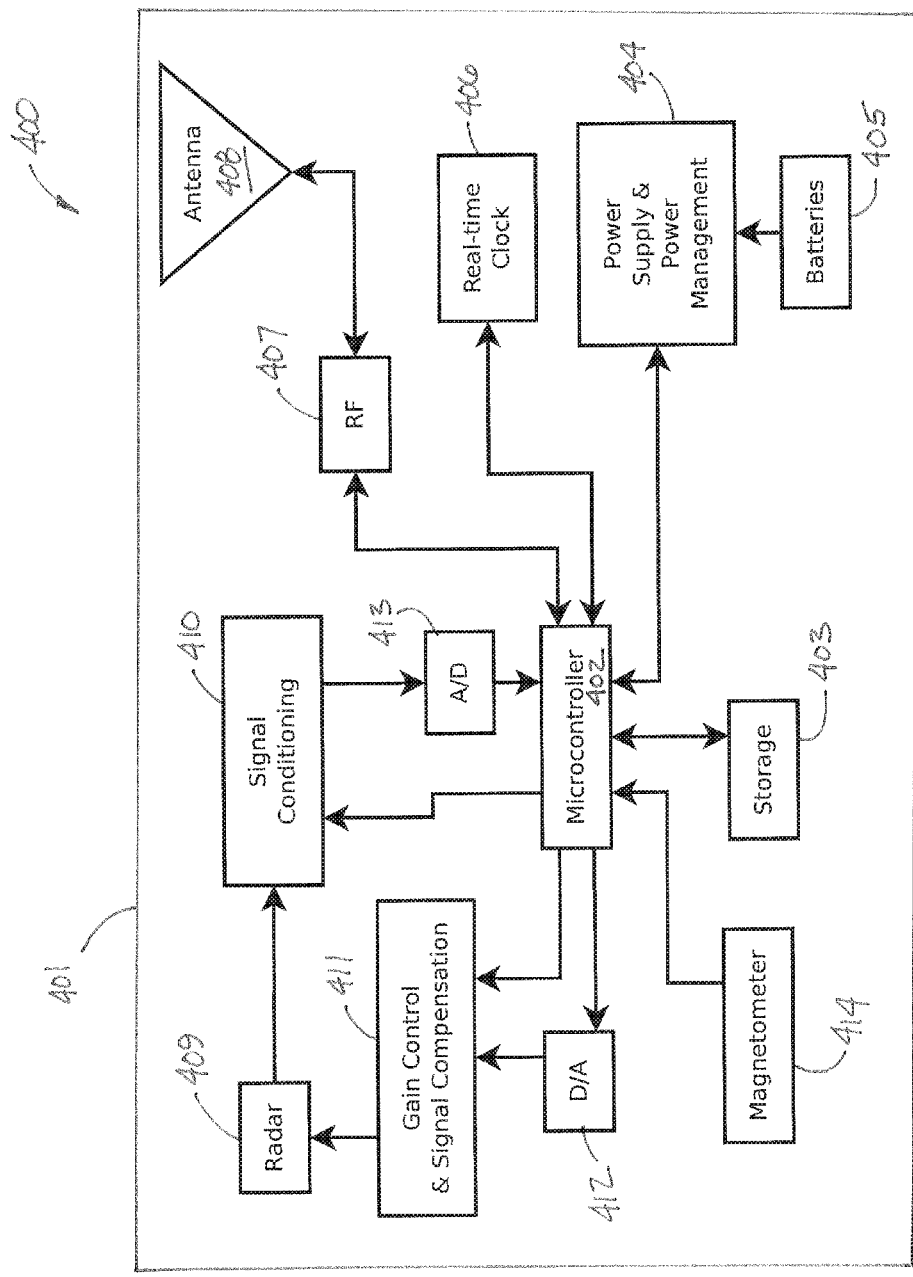
FIG. 3 is a schematic illustration of a portion of the vehicle parking meter system of FIG. 1 in accordance with aspects of the disclosed embodiment.

Referring to FIG. 3 each sensing device 120A-120C, 121A-121C, 122A-122C in the groups 120, 121, 122 of sensing devices may be substantially similar to sensing device 400. In one aspect the sensing device 400 may include any suitable housing 401. The housing 401 may have any suitable shape and be constructed of any suitable material so that in one aspect the sensing device may be placed or otherwise embedded at least partly within the ground/roadway of a parking space (e.g. substantially below or substantially even with or substantially above a driving surface of the parking space). In another aspect the housing 401 may be configured for placement above ground at any suitable location for sensing vehicles in a respective parking space. The housing 401 may be configured to house components of the sensing device 400 such as a processor 402, memory 403 (which is suitably configured along with the processor 402 to effect the operational aspects of the sensing devices as described herein), sensor system clock 406, a sensor power system, a sensor communication system and any suitable vehicle detection sensors. In one aspect the sensor power system may include a power supply and management unit 404 that is connected to the processor 402. Any suitable power storage unit(s) 405 may be connected to the power supply and management unit 404 for supplying power to the components of the sensing device 400. The power supply and management unit 404 may be configured to regulate and distribute power from the power storage units 405 in any suitable manner, such as under the control of the processor 402. The sensor communication system may include a communication module 407 (which may be any suitable radio frequency communication module) connected to the processor 402 and an associated antenna 408. The antenna 408 may be any suitable antenna such as in one aspect an omnidirectional antenna and in another aspect a directional antenna. Where the antenna 408 is a directional antenna suitable motors or other solid state or mechanical drive unit may be provided for swiveling or otherwise rotating the antenna so that a signal strength of a received or sent communication is maximized in a manner substantially similar to that described above with respect to the gateway 110 (FIG. 2). The vehicle detection sensors may be any suitable vehicle detection sensors including but not limited to radar sensor(s) 409 and magnetometer(s) 414. The magnetometer 414 and radar sensor 409 may be connected to the processor 402 in any suitable manner and be configured to sense a vehicle individually (e.g. operate separately—the processor may use either the radar sensor 409 or the magnetometer to sense the vehicle), in conjunction with each other (e.g. operate together), or according to any predetermined sequence of operation. For example, the radar sensor 409 may be used to verify the sensing activity of the magnetometer 414 or vice versa. As may be realized any suitable ancillary circuitry may be provided to allow communication of one or more of the vehicle sensors 409, 414 with the processor 402. For example, a digital to analog convertor 412 and/or a gain control and signal compensation module 411 may be provided for communications from the processor 402 to the radar sensor 409 while a signal conditioning module 410 and analog to digital convertor 413 may be provided for communication from the radar sensor 409 to the processor 402.

Referring again to FIG. 1 and FIG. 4, in operation, there may be groups of gateways 300-302 each having one or more gateways 110A-110C, 310A-C, 300D-310F where each gateway is in communication with the central controller 101 through, for example, one or more communicators 140 which in this aspect are cellular providers 140A, 140B, 140C. Using gateway group 300 and associated sensing device groups 120-122 as an example, several levels of redundancy may be provided for communication within the vehicle parking meter system 100. As will be explained in greater detail below there may be one level of redundancy with respect to communication between the sensing devices within the sensing device groups 120-122 and the gateways 110A-110C. There may be another level of redundancy between communications between the gateways 110A-110C and the communicators 140A-140C. There may also be a level of redundancy with respect to communications from the sensing devices where sensing device messages are stored within a gateway 110A-110C when one or more gateways and the communicators 140A-140C are unavailable.

As noted above, each gateway 110A-110C may be paired with its own group 120, 121, 122 of sensing devices. The sensing devices 120A-120C, 121A-121C, 122A-122C may be any suitable sensing devices such as those described in United States Provisional patent applications having U.S. provisional patent application Nos. 61/824,512 and 61/824,630 filed on May 17, 2013 (now U.S. non-Provisional patent applications respectively having attorney docket numbers 1195P014931-US(PAR) and 1195P014933-US(PAR) and filed on May 19, 2014), the disclosures of which are incorporated herein by reference in their entireties. In one aspect the sensing devices may detect the arrival and departure of vehicles within associated parking spaces. For example, as noted above, one or more sensing devices may be located (e.g. such as embedded in the road surface or otherwise) in each parking space monitored by the vehicle parking meter system 100. Each gateway 110A-110C in the group of gateways 300 may provide a redundancy for communication with the sensing device groups 120-122. In one aspect the gateways may be arranged or otherwise positioned throughout a deployment area of the vehicle parking meter system 100 so that each sensing device is capable of communicating with at least two gateways. As an example, gateway 110A may be paired as a primary gateway with sensing devices 120A-120C within sensing device group 120 (e.g. that define a primary sensing device group for gateway 110A) and paired as a secondary gateway with sensing devices within sensing device groups 121, 122 (e.g. that define secondary sensing device groups for gateway 110A). Gateway 110B may be paired as a primary gateway with sensing devices 121A-121C within sensing device group 121 (e.g. that define a primary sensing device group for gateway 110B) and paired as a secondary gateway with the sensing devices of sensing device groups 120, 122 (e.g. that define secondary sensing device groups for gateway 110B). Gateway 110C may be paired as a primary gateway with sensing devices 122A-122C within sensing device group 122 (e.g. that define a primary sensing device group for gateway 110C) and paired as a secondary gateway with sensing devices in sensing device groups 120, 121 (e.g. that define secondary sensing device groups for gateway 110C).

It is noted that a primary gateway is the gateway given priority when communicating with a respective primary sensing device group. Secondary gateways are configured to communicate with their secondary sensing device groups when the primary gateway for those secondary sensing device groups is unavailable. In other words, each gateway 110A-110C in the group of gateways 300 provides each sensing device in each primary sensing device group with a redundant gateway (e.g. if one of the gateways 110A-110C in the group of gateways 300 is unavailable the other gateways 110A-110C within that group of gateways are configured to allow communication with the sensing devices associated with the unavailable gateway). For example, if gateway 110A is unavailable, either one of gateway 110B or gateway 110C allows communication with the sensing devices of sensing device group 120. Each gateway 110A-110C within the group may be prioritized with each other with respect to the redundant communication. The prioritization for communication with a sensing device within a sensing device group 120-122 with a secondary gateway (e.g. which secondary gateway is chosen for communication and in what sequence) may be based on a proximity of a secondary gateway to the primary sensing device group for the unavailable gateway (e.g. so that the least amount of power is used by the sensing devices when communicating with the secondary gateway) or based on any other suitable criteria. In one aspect the gateways 110A-110C are configured to listen for messages from the sensing devices (e.g. primary sensing devices, secondary sensing devices or both) and when a message is received from a sensing device that message is acknowledged by the gateway so that there is an indication sent back to the sensing device that the message was received by the gateway. If the sensing device does not receive an acknowledgement message the sensing device then proceeds to communicate with each of the secondary gateways according to the gateway prioritization until an operational gateway acknowledges the sensing device message.

In one aspect the gateways 110A-110C may be able to communicate with each other and provide health and welfare messages to each other regarding an operational state of the gateway. If one gateway receives a message from another gateway that it is unavailable for communication with its primary sensing device group the gateway receiving that message may listen for messages from the primary sensing device group for the unavailable gateway. The health and welfare message may also be sent to the central controller 200 for system management and monitoring where any unavailability in the system may be addressed by maintenance personnel.

As noted above and still referring to FIG. 4, each gateway may also be configured to communicate with the central controller 101 (FIG. 1) through one or more communicators 140A-140C which in this aspect may be cellular providers. Cellular provider as used herein may refer to a cellular network access point and/or cellular carrier. In other aspects any suitable communication protocols may be used as mentioned above, where each form of communication has one or more access points available to the gateway groups 300-302. In still other aspects each gateway may be connected to one or more communicators 140A-140C over different communication protocols. For example, gateways in group 300 may be connected to communicator 140A over a cellular connection, connected to communicator 140B over a public switched telephone network and connected to communicator 140C over a network connection such as the World Wide Web. Each gateway group 300-302 may be associated or otherwise paired with a predetermined (e.g. a primary) one of the communicators 140A-140C. For example, the pairing between the communicators 140A-140C and each group of gateways 300-301 may be based on, for example, proximity (e.g. so the least amount of power may be used for communication) between each group of gateways and the cellular provider or any other suitable criteria. As may be realized, one communicator 140A-140C may serve as a primary cellular provider for more than one gateway group. Still using gateway group 300 as an example, each gateway 110A-110C may be capable of communicating with at least two cellular providers to provide another level of redundancy in the vehicle parking meter system 100. As an example, referring to FIG. 4, if a gateway 110A-110C in sensing device group 300 is paired with communicator 140A as a primary communicator and with one or more of the communicators 140B, 140C as secondary communicators (FIG. 5, Block 500) which may be prioritized for access in a manner similar to that described above with respect to the gateway access by the sensing devices (e.g. based on proximity so that the gateway chooses the closest available cellular provider so that the lowest power is used by the gateway for communication with the cellular provider, preference of communication protocol—e.g. wired or wireless, etc.). In one aspect, the gateways 110A-110C may be configured to determine the proximity of each communicator 140A-140C to the gateway 110A-110C and communicate with the closest available communicator 140A-140C to effect power consumption efficiency of the gateway 110A-110C. Preference may be given to the communicator 140A by the gateway 110A-110C when communicating with the central controller 101. If the communicator 140A is unavailable the gateway 110A-110C may switch communications to communicate with a secondary communicator 140B, 140C according to any suitable predetermined priority of the secondary cellular providers until an available provider is found (FIG. 5, Block 510) (e.g. the gateway may look for the best communication between the gateway and a communicator). As may be realized the gateway may be configured to receive an acknowledgment message from the communicator 140A-140C and if that acknowledgement message is not received the gateway 110A-110C may then proceed to communicate with the other cellular providers.

Figure 5:
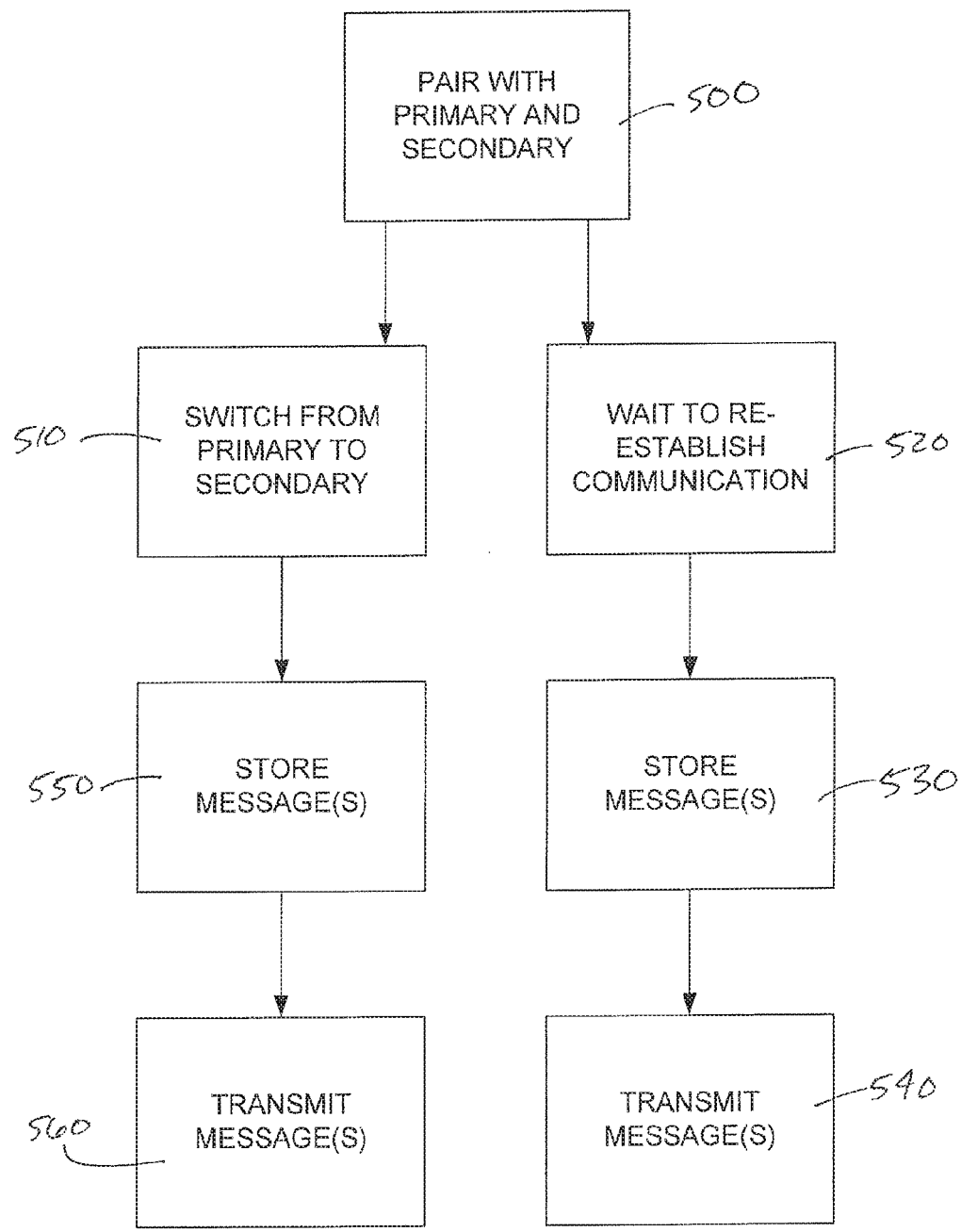
FIG. 5 is a flow diagram in accordance with aspects of the disclosed embodiment.

In another aspect the gateway 110A-110C may not switch communicators 140A-140C if its primary communicator becomes unavailable where the gateway 110A-110C is configured to wait to re-establish communication with its primary communicator 140A-140C (FIG. 5, Block 520). In one aspect the gateway 110A-110C may be configured to wait a predetermined length of time before switching between communicators 140A-140C. Here, there may be a level of redundancy with respect to communications from the sensing devices where sensing device messages are stored within a gateway 110A-110C one or more communicators 140A-140C are unavailable. In one aspect, using gateway 110A as an example, gateway 110A may establish communication with communicator 140A (which may be the primary communicator for gateway 110A). If the communicator 140A becomes unavailable the gateway may store messages from the one or more of the sensing device groups 120-122 (e.g. primary sensing devices and/or secondary sensing devices) within a memory of the gateway 110A (FIG. 5, Block 530). The gateway may monitor the availability of the primary communicator 140A and transmit the stored messages when the gateway 110A re-establishes communication with the primary communicator 140A. Each message stored by the gateway 110A is given a time stamp indicating when the message was received by the gateway 110A so that, for example, the arrival, departure, violation, and other messages from the sensing devices can be accurately tracked and applied to user accounts by the central controller 101. When communication is re-established with the communicator 140A the gateway 110A transmits the message with the time stamp to allow the central controller 101 to monitor the activity of the corresponding parking spaces (FIG. 5, Block 540). Where one or more gateways 110A-110C are unavailable and communication with the communicators 140A-140C cannot be established the sensing devices will communicate with the primary and secondary gateways 110A-110C until an available gateway (e.g. referred to herein as a store forward gateway) is found. In this case only the store forward gateway will store the time stamped messages until communication is re-established with either another gateway or at least one of the communicators 140A-140C (FIG.

5, Block 550). In one aspect if the messages are stored in a secondary gateway and communication is re-established with the primary (or other optimal) gateway the secondary gateway may transfer the messages (FIG. 5, Block 560) to the primary gateway for transmission to the central controller 101. If the communicators are unavailable after the transfer of the messages to the primary gateway the primary gateway may store the messages until communication is re-established with the communicators. In another aspect, the secondary gateway may transfer the messages to the central controller when communication is re-established with one or more the communicators 140A-140C. In still another aspect if there are no available gateways 110A-110C the sensing devices 120A-120C, 121A-121C, 122A-122C time stamp and store the messages and send to stored messages when one or more gateways re-establishes communication with the sensing devices.

Figure 6:
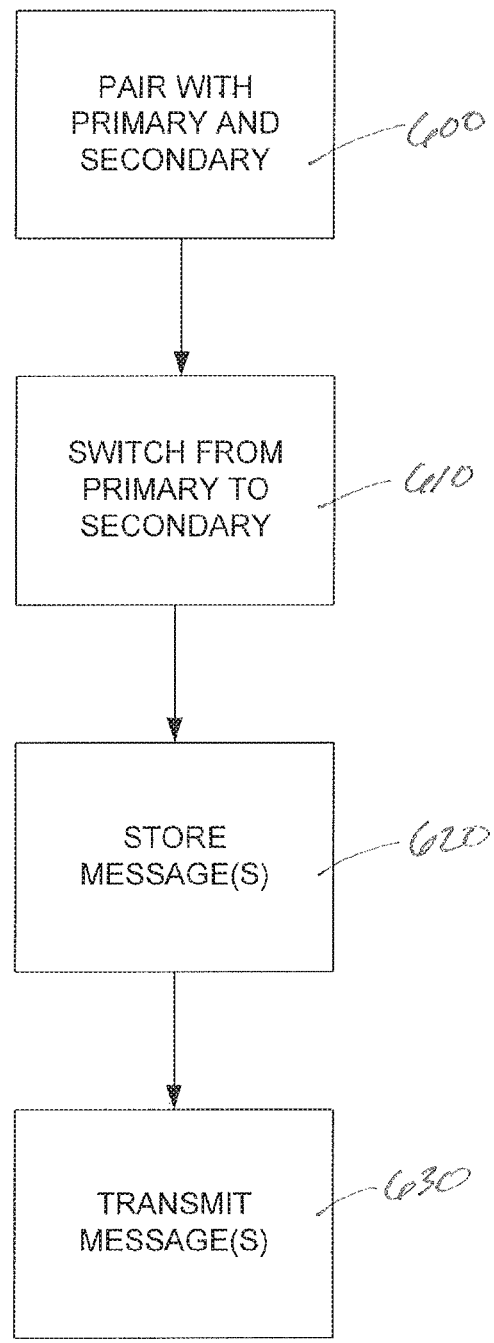
FIG. 6 is a flow diagram in accordance with aspects of the disclosed embodiment.

In a manner similar to that described above between the gateways 110A-110C and the communicators 140A-140C, the sensing devices 400 (FIG. 3) are paired with a primary gateway and at least one secondary gateway (FIG. 6, Block 600), e.g. in a respective gateway group or in another gateway group, in any suitable manner. For example, the sensing devices 400 may be configured to automatically determine which gateway is to be the primary gateway based on any suitable criteria, such as for example, a communication signal strength between the sensing device and gateway and/or a distance between the sensing device and gateway (e.g. based on GPS information provided by the gateway). In other aspects the primary gateway may be manually selected in any suitable manner, such as through line of sight. The sensing device 400 may be configured to switch communications from the primary gateway to a secondary gateway (FIG. 6, Block 610) when communication between the primary gateway and one or more communicators is unavailable and/or when the primary gateway is unavailable or when communications with the primary gateway are crowded. For example, referring to FIG. 4, the sensing devices 122A-122C in sensor group 122 may be paired with one of the gateways 110A-110C as a primary gateway and be paired with other ones of gateways 110A-110C and/or gateways 310A-310E of gateway groups 301, 302 as secondary gateways. Selection of a secondary gateway by the sensing device 400 can be based on any suitable priority or criteria similar to that described above with respect to the gateways selecting secondary communicators (e.g. the sensing device may look for the best communication between the sensing device and the gateway). In other aspects where there are no gateways available the sensing devices 400 may be configured to time stamp and store any suitable parking data in the memory 403 (FIG. 6, Block 620) and transmit the stored data when communication a gateway 110 is re-established (FIG. 6, Block 630).

In one aspect each gateway 110A-110C communicates with their respective sensing devices 120A-120C, 121A-121C, 122A-122C over any suitable wired or wireless communication interface (that e.g. may be substantially similar to that described above between the gateways and the communicators) in a time division duplexing (TDD) manner using a pseudo random channel sequence. For example, the sensing devices 400 may initiate a message (e.g. that includes data embodying a status of a parking space being monitored and/or a health and maintenance status of the sensing device) that requires or otherwise results in a response from a gateway 110 (either primary or secondary gateway), and "sleeps" or otherwise removes itself from active engagement with the gateway 110 until the sensing device 400 determines that it is time to ready itself for communication with the gateway 110. In one aspect the gateway 110 and the sensing device 400 may communicate over a wireless communication link where the transmission of messages and responses can be sent over any of a plurality of available transmission frequencies. Frequency hopping is used to the extent that transmissions of information and receptions of communicated information take place according to sequences of communication frequencies. In a frequency hopping system, the communication frequencies do not remain constant, but rather are changed over time and/or in connection with triggering events in order to continually change the frequency in which information is communicated.

In one aspect, at least one frequency hopping sequence is shared and substantially synchronized between the sensing devices 400 and the gateways 110. In a frequency hopping system, response timing and coordination is not a trivial consideration. Responses to messages may not be formulated at the gateway 110 at any specific time, but rather response formulation can be completed at any time relative to the currently active frequency in the frequency hopping sequence. Thus, the sensing device 400 may not be able to expect to receive a response at some certain time. If the sensing device 400 listened for a response(s) at every frequency of the frequency hopping sequence, the sensing device 400 would need to continually attempt to receive and process information. Such continual monitoring requires, among other things, significant processing resources and involves significant power consumption. This is particularly troublesome where the sensing device 400 is battery powered, as valuable limited power resources may be unnecessarily wasted.

The sensing device 400 and gateway 110 share a frequency hopping sequence. For example, each of the sensing device 400 and gateway 110 may synchronously step through each of the frequencies of the frequency hopping sequence to know which frequency is active for communications at a given time. Any manner of synchronizing such a shared frequency hopping sequence(s) may be used. In normal operation the frequencies of the frequency hopping sequence may be considered to recycle in a continuous loop.

Figure 4:
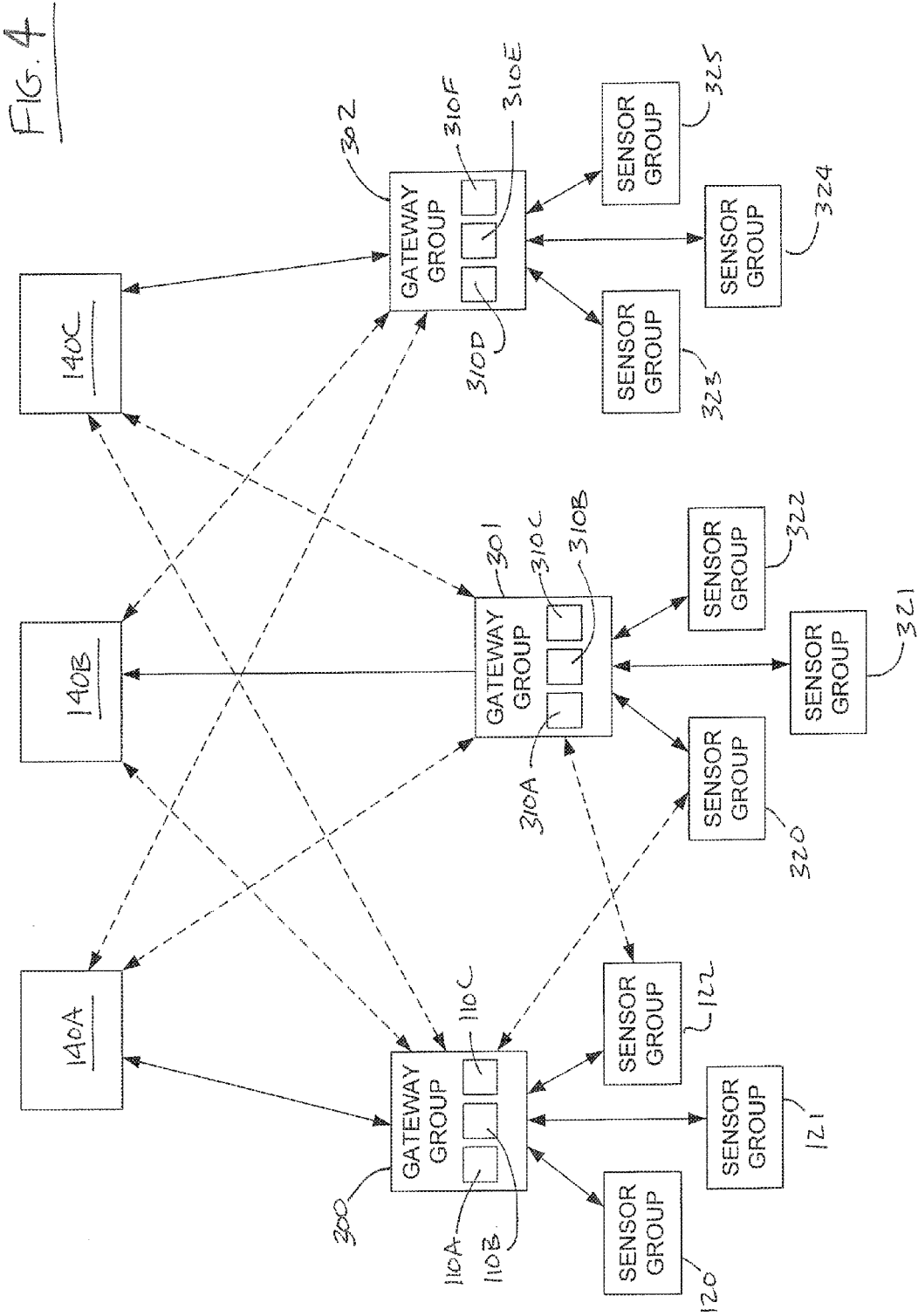
FIG. 4 is a schematic illustration of a portion of the vehicle parking meter system of FIG. 1 in accordance with aspects of the disclosed embodiment.

In one embodiment, the active frequency in which a message is to be transmitted by the sensing device 400 is determined by for example, the processor 402 (FIG. 4). For example, the processor 402 may store or otherwise access the frequency hopping sequence, and may also store the last transmission frequency that was used to send a message. By knowing the sequence and the last used transmission frequency, the sensing device 400 can readily identify the next transmission frequency to use in the frequency hopping sequence. In aspects, the frequency that is currently active, or active at some future time (e.g. the frequency after the currently active frequency), may be used to transmit the message. In still other aspects, any manner of determining a frequency in which to transmit the message may be used.

Not only may the frequency hopping sequence be used to determine at which frequency messages will be transmitted, in one aspect it may be used to monitor for incoming messages. For example, the sensing devices 400 may know which frequency to monitor, and at what time and/or for what duration. The processor 402 may be used to determine when each of the frequencies in the frequency hopping sequence is to become the active frequency in which to monitor for incoming signals (e.g. response signals) from, for example the gateway 110. In one aspect, the processor 402 may determine when the same frequency at which the message was transmitted will reoccur in the frequency hopping sequence. As an example, the processor 402 may calculate a time duration based on at least the number of frequencies in the frequency hopping sequence, the order (sequence) of the frequencies, and a time slot duration in which each of the frequencies is active, until the same frequency used to transmit the message arises again in the sequence. In one aspect the processor 402 may use the clock 406 to count out the calculated time duration to know when the frequency will again become active in the sequence.

In one aspect the processor 402 can be configured to cause one or more functional components 403-414 to enter a sleep mode during the calculated time interim between occurrences of the relevant frequency. In one aspect the sensing devices 400 enter a sleep mode after transmitting a respective message. This may occur immediately following message transmission, or after some other event(s) such as receiving a message acknowledgement or at any suitable time after receiving or sending a message. The sleep mode may involve reducing and/or suspending one or more functional operations and/or device components to conserve local resources such as processing power, battery power, etc. For example, to conserve power, in one aspect the sensing devices 400 may enter a sleep mode after sending a message and receiving a message acknowledgement from a gateway 110. In another aspect, entering such a sleep mode after transmitting a message to a gateway 110 without receiving a response from the gateway as the response from the gateway 110 may not be immediately provided such as when the gateway is unavailable.

In one aspect, each gateway 110A-110C may transmit continuously using TDD and may be capable of changing communication channels/frequencies (it is noted that the terms channel and frequency are used interchangeably herein) according to a predetermined channel/frequency switching/hopping scheme (e.g. channel hopping as described above). It is noted that each gateway may have a respective channel/frequency switching scheme that is different from the channel/frequency switching scheme of other gateways. The gateway 110 may hop between any suitable number of frequencies when communicating with the sensing devices 400 over any suitable frequency band. In one aspect, as an example, the gateway 110 may hop between 50 frequencies over a frequency band of 902 Mhz to 928 Mhz while in other aspects the number of frequencies may be more or less than 50 and the frequency band may be higher or lower than 902 Mhz to 928 Mhz. In one aspect with each channel change, an outgoing message is transmitted by the gateway 110A-110C and then the gateway 110A-110C listens for response messages from the respective sensing devices 120A-120C, 121A-121C, 122A-122C. As such, at any given time the gateway 110A-110C is communicating with each of the respective (e.g. primary and secondary) sensing devices 120A-120C, 121A-121C, 122A-122C over a common communication channel. In one aspect the channel rate change may be, for example, approximately 100 mSec and the outgoing message from the gateway 110A-110C may use approximately 40% of the channel communication window allowing for long sensing device response times. In other aspects the channel rate change may be any suitable time interval (e.g. more or less than 100 mSec) and the outgoing message may use any suitable percentage of the channel communication window. The processor module 200 (FIG. 2) of each gateway 110A-110C may be configured with any suitable number of channel hopping sequences such as for example, 256 channel hopping sequences. Each gateway may also be assigned any suitable address identifier such as, for example, a 16 bit address identifier that is unique to each gateway 110A-110C. Each gateway 110A-110C may be configured to broadcast its unique address identifier in, for example, the outgoing message so that the sensing devices may listen for the address identifier and determine which gateway 110A-110C they can communicate with. Once communication is established between the gateway 110A-110C and the respective sensing device(s) 120A-120C, 121A-121C, 122A-122C predetermined parameters of the gateway (such as, e.g., the address identifier and channel hopping sequence) that are needed by the sensing devices for communication with the gateway may be updated at any suitable time such as on an as needed basis or at any suitable predetermined time frequency.

In one aspect the gateway 110A-110C may be configured for adaptive channel/frequency hopping so that a channel is changed and/or avoided when, for example, an error rate for particular channels exceeds a predetermined error rate threshold. As an example, if there is a frequency jam or other error the gateway is configured to select a new channel/frequency to be used in the hopping sequence. It is noted that in one aspect all of the gateways in a gateway group transmit messages substantially at the same time and listen for messages from the sensing devices substantially at the same time to, for example, reduce a possibility of self jamming. In other aspects any number of the gateways in the distributed remote sensing system may transmit at substantially the same time and listen substantially at the same time to, for example, reduce a possibility of self jamming. Similarly it is noted that any suitable number of sensing devices 400 may communicate with the gateways at substantially the same time. The gateway 110A-110C may send a "next hop index" message in every time slot of the outgoing message such that, when compared to a hop index of the sensing devices 120A-120C, 121A-121C, 122A-122C, the next channel being "hopped to" should match in both the gateway hop sequence index and a sensing device hop sequence index. In one aspect several spare channels known to both the gateway 110A-110C and their respective sensing devices 120A-120C, 121A-121C, 122A-122C may be available. The gateway 110A-110C may be configured to dynamically direct the sensing devices to select the spare channel, if that spare channel is a valid spare for the particular channel hopping sequence.

In one aspect, as noted above, the sensing devices 400 may be configured to sleep or otherwise deactivate one or more components to, for example, conserve power. As may be realized, when communicating with the pseudo random channel sequence the frequencies of the sensing devices 400 and the gateways 110 must match for communication to occur between the two. In one aspect, a sensing device 400 may sleep for a predetermined period of time (FIG. 7, Block 700) and when the sensing device 400 wakes up it must synchronize with the hopping frequency of the gateway 110. Here the sensing device 400 is configured to track the period of time the sensing device has been asleep (e.g. the sleep time) in any suitable manner such as by using, e.g., the sensor system clock 406 (FIG. 7, Block 710) and is configured upon waking to look forward an amount of time substantially equal to the sleep time, e.g. to compensate for the sleep time, (FIG. 7, Block 720) so that the frequencies of the sensing device 400 and the gateway 110 are synchronized for communication (e.g. the sensing device picks the active frequency of the channel hopping sequence upon waking from sleep) substantially immediately upon waking so that real time data may be provided by the sensing device

Figure 7:
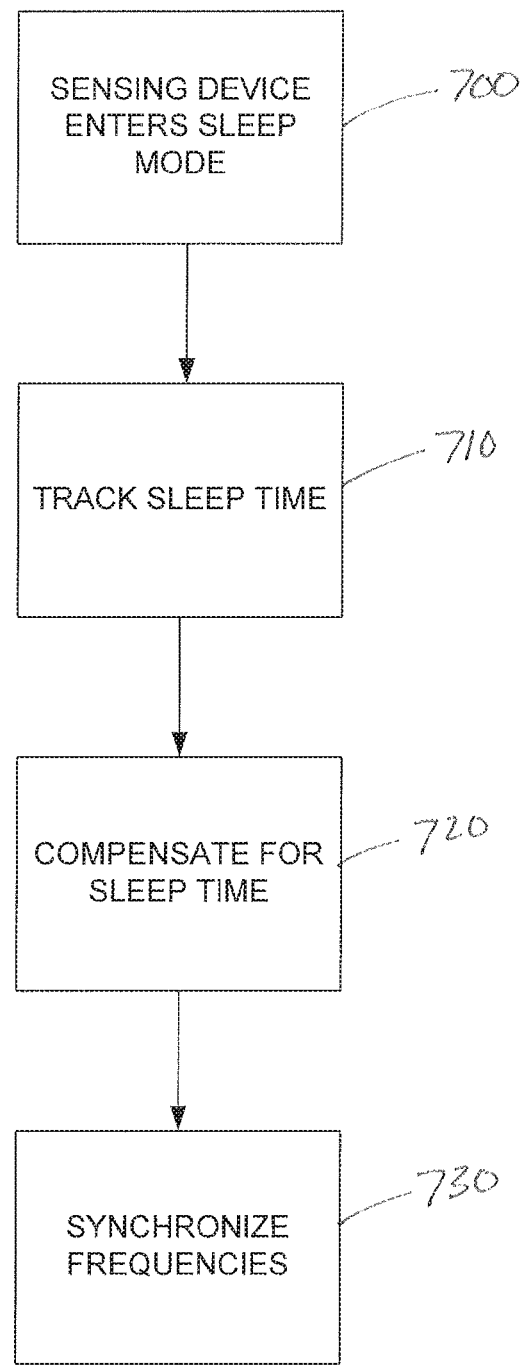
FIG. 7 is a flow diagram in accordance with aspects of the disclosed embodiment.

400 (FIG. 7, Block 730). In one aspect to facilitate the frequency synchronization the frequency hopping scheme of one or more gateways 110 may be stored within, for example, the memory 403 of the sensing devices 400. In one aspect the frequency hopping scheme and/or sensor system clock may be updated and in the case of the clock 406 synchronized with the clock 204 of the gateway at any suitable time intervals when communication is established between the primary and/or secondary gateways and the sensing devices. In one aspect the sensor system clock 406 may be synchronized with the gateway clock 204 at every transmission from the gateway (e.g. a current time of the gateway is sent to the sensing devices substantially every time the gateway sends a transmission to the sensing devices).

In one aspect the interface between the gateways 110 and the respective sensing devices 400 may allow for a remote change in configuration and/or updating of any suitable predetermined characteristic of the sensing devices 400. In one aspect the predetermined characteristic may include a firmware version, one or more of a frequency hopping sequence for the communication interface, days of sensing device operation, hours of sensing device operation, a radar sensor strength, a magnetometer sensitivity, and a magnetometer calibration. As may be realized the configuration updates of each sensing device 400 may be effected from, for example, the central controller 101 (FIG. 1) in any suitable manner such as automatically or initiated by a user of the central controller. The communication interface between the sensors 400 and the gateways 110 also allows health and welfare signals to be shared between the gateways and sensing devices. In one aspect the sensing devices 400 may send a health and welfare message to a respective gateway at any suitable predetermined time intervals. For example, in one aspect the health and welfare messages may be sent substantially every 30 minutes while in other aspects the health and welfare messages may be sent at intervals that are less than or greater than 30 minutes. In still another aspect the health and welfare message may also include an occupancy status of a respective parking space being monitored by the sensing device 400. Where the sensing device is in high traffic areas and a high number of occupancy transitions within the respective parking space are keeping the sensing device 400 from sleeping the sensing device 400 may be configured to turn itself off (e.g. go to sleep) to conserve power. The gateways 110 may also send health and welfare messages to the respective sensing devices 400 so that the sensing devices 400 may switch to a secondary gateway if the primary gateway is not capable of transmitting messages from the sensing devices to the central controller 101 (FIG. 1).

In accordance with one or more aspects of the disclosed embodiment a distributed remote sensing system is provided. The distributed remote sensing system includes at least one gateway, at least one sensing device and a communication interface providing radio frequency communication through a shared frequency scheme between each sensing device and one of the at least one gateway and between each sensing device and another of the at least one gateway through a different frequency scheme.

In accordance with one or more aspects of the disclosed embodiment the distributed remote sensing system comprises a parking monitoring system.

In accordance with one or more aspects of the disclosed embodiment, the communication interface further provides communication between the at least one gateway and a peripheral device.

In accordance with one or more aspects of the disclosed embodiment, communication between the at least one gateway and the peripheral device is through a central controller.

In accordance with one or more aspects of the disclosed embodiment, the peripheral device is a handheld device and the central controller provides parking space information on a display of the peripheral device.

In accordance with one or more aspects of the disclosed embodiment the distributed remote sensing system includes a controller configured to process data from the at least one sensing device.

In accordance with one or more aspects of the disclosed embodiment the at least one sensing device is configured to switch communication from the one of the at least one gateway to the another of the at least one gateway in response to an attribute of a communication with the one of the at least one gateway.

In accordance with one or more aspects of the disclosed embodiment the at least one sensing device is configured to initiate the switch in communication from the one of the at least one gateway to the another of the at least one gateway.

In accordance with one or more aspects of the disclosed embodiment the another of the at least one gateway has a frequency hopping scheme shared with the at least one sensing device.

In accordance with one or more aspects of the disclosed embodiment the at least one sensing device selects a frequency of the frequency hopping scheme corresponding to a time of switching from the one of the at least one gateway to the another of the at least one gateway.

In accordance with one or more aspects of the disclosed embodiment a distributed remote sensing system is provided. The distributed remote sensing system includes at least one gateway, at least one sensing device and a communication interface providing radio frequency communication through a shared frequency scheme between each sensing device and one of the at least one gateway and between each sensing device and another of the at least one gateway through a different frequency scheme where the communication interface is configured for adaptive change in response to an attribute of a communication between the at least one sensing device and the at least one gateway.

In accordance with one or more aspects of the disclosed embodiment the distributed remote sensing system comprises a parking monitoring system.

In accordance with one or more aspects of the disclosed embodiment the distributed remote sensing system includes a controller configured to process data from the at least one sensing device.

In accordance with one or more aspects of the disclosed embodiment the at least one sensing device is configured to switch communication from the one of the at least one gateway to the another of the at least one gateway in response to an attribute of a communication with the one of the at least one gateway.

In accordance with one or more aspects of the disclosed embodiment the at least one sensing device is configured to initiate the switch in communication from the one of the at least one gateway to the another of the at least one gateway.

In accordance with one or more aspects of the disclosed embodiment a distributed remote sensing system is provided. The distributed remote sensing system includes at least one gateway, at least one sensing device and a communication interface providing radio frequency communication through a shared frequency scheme between each sensing device and one of the at least one gateway and between each sensing device and another of the at least one gateway through a different frequency scheme where the communication interface is configured to allow configuration of a predetermined characteristic of each sensing device over the communication interface.

In accordance with one or more aspects of the disclosed embodiment the distributed remote sensing system comprises a parking monitoring system.

In accordance with one or more aspects of the disclosed embodiment the distributed remote sensing system includes a controller configured to process data from the at least one sensing device.

In accordance with one or more aspects of the disclosed embodiment the predetermined characteristic of each sensing device includes one or more of a frequency hopping sequence for the communication interface, firmware version, days of sensing device operation, hours of sensing device operation, a radar sensor strength, a magnetometer sensitivity, and a magnetometer calibration.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A distributed remote sensing system comprising:
   at least one gateway;
   at least one sensing device; and
   a communication interface providing radio frequency communication through a predetermined shared variable frequency scheme between each sensing device and one of the at least one gateway and between each sensing device and another of the at least one gateway through a different variable frequency scheme that is independent of the predetermined shared variable frequency scheme, wherein the at least one sensing device predeterminately pairs with the one of the at least one gateway and the another of the at least one gateway and is configured so as to switch communications between the one of the least one gateway and the another of the at least one gateway based on unavailability of at least one of either the one of the at least one gateway and the another of the at least one gateway.

2. The distributed remote sensing system of claim 1, wherein the at least one sensing device is further configured to store a time stamp data at the at least one sensing device based on both of the one of the at least one gateway and the another of the at least one gateway being unavailable.

3. The distributed remote sensing system of claim 2, wherein the at least one sensing device transmits the time stamp data when either of the one of the at least one gateway and the another of the at least one gateway becomes available.

4. The distributed remote sensing system of claim 1, wherein the distributed remote sensing system comprises a parking monitoring system.

5. The distributed remote sensing system of claim 1, wherein the communication interface further provides communication between the at least one gateway and a peripheral device.

6. The distributed remote sensing system of claim 5, wherein communication between the at least one gateway and the peripheral device is through a central controller.

7. The distributed remote sensing system of claim 1, wherein the at least one sensing device is configured to switch communication from the one of the at least one gateway to the another of the at least one gateway in response to an attribute of a communication with the one of the at least one gateway.

8. The distributed remote sensing system of claim 7, wherein the at least one sensing device is configured to initiate the switch in communication from the one of the at least one gateway to the another of the at least one gateway.

9. The distributed remote sensing system of claim 7, wherein the another of the at least one gateway has a frequency hopping scheme shared with the at least one sensing device.

10. The distributed remote sensing system of claim 9, wherein the at least one sensing device selects a frequency of the frequency hopping scheme corresponding to a time of switching from the one of the at least one gateway to the another of the at least one gateway.

11. A distributed remote sensing system comprising:
    at least one gateway;
    at least one sensing device; and
    a communication interface providing radio frequency communication through a predetermined shared variable frequency scheme between each sensing device and one of the at least one gateway and between each sensing device and another of the at least one gateway through a different variable frequency scheme that is independent of the predetermined shared variable frequency scheme, wherein the at least one sensing device predeterminately pairs with the one of the at least one gateway and the another of the at least one gateway and is configured so as to store a time stamp data at the at least one sensing device based on both of the one of the at least one gateway and the another of the at least one gateway being unavailable.

12. The distributed remote sensing system of claim 11, wherein the at least one sensing device is further configured so as to switch communications between the one of the least one gateway and the another of the at least one gateway based on a predetermined length of time of unavailability of at least one of either the one of the at least one gateway and the another of the at least one gateway.

13. The distributed remote sensing system of claim 11, wherein the at least one sensing device transmits the time stamp data when either of the one of the at least one gateway and the another of the at least one gateway becomes available.

14. The distributed remote sensing system of claim 11, wherein the communication interface further provides communication between the at least one gateway and a peripheral device.

15. The distributed remote sensing system of claim 14, wherein communication between the at least one gateway and the peripheral device is through a central controller.

16. The distributed remote sensing system of claim 15, wherein the peripheral device is a handheld device and the central controller provides parking space information on a display of the peripheral device.

17. The distributed remote sensing system of claim 11, further comprising a controller configured to process data from the at least one sensing device.

18. A method comprising:
providing at least one gateway;
providing at least one sensing device;
providing, with a communication interface, radio frequency communication through a predetermined shared variable frequency scheme between each sensing device and one of the at least one gateway and between each sensing device and another of the at least one gateway through a different variable frequency scheme; and
predeterminately pairing, via the communication interface, each sensing device with the predetermined shared variable frequency scheme corresponding to each sensing device from different variable frequency schemes of the communication interface and the at least one sensing device.

19. The method of claim 18, further comprising switching communications between the one of the least one gateway and the another of the at least one gateway based on unavailability of at least one of either the one of the at least one gateway and the another of the at least one gateway.

20. The method of claim 18, further comprising storing a time stamp data at the at least one sensing device based on both of the one of the at least one gateway and the another of the at least one gateway being unavailable.

* * * * *